United States Patent
Lesner et al.

(10) Patent No.: US 11,657,447 B1
(45) Date of Patent: May 23, 2023

(54) TRANSACTION-BASED VERIFICATION OF INCOME AND EMPLOYMENT

(71) Applicant: INTUIT INC., Mountain View, CA (US)

(72) Inventors: Christopher Z. Lesner, Palo Alto, CA (US); Alexander S. Ran, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 1263 days.

(21) Appl. No.: 14/634,436

(22) Filed: Feb. 27, 2015

(51) Int. Cl.
*G06Q 40/00* (2012.01)

(52) U.S. Cl.
CPC .................................. *G06Q 40/00* (2013.01)

(58) Field of Classification Search
CPC ....................................................... G06Q 40/00
See application file for complete search history.

(56) References Cited

U.S. PATENT DOCUMENTS

| | | | | |
|---|---|---|---|---|
| 5,999,975 A * | 12/1999 | Kittaka | ............... | G06F 16/9535 709/224 |
| 8,595,148 B1 * | 11/2013 | Borgen | ................ | G06Q 10/105 705/26.5 |
| 9,147,042 B1 * | 9/2015 | Haller | .................... | G06F 19/328 |
| 2001/0011281 A1 * | 8/2001 | Fry | ........................ | G06F 16/955 715/273 |
| 2006/0112041 A1 * | 5/2006 | Hitt | ....................... | G06K 9/6217 706/20 |
| 2014/0369602 A1 * | 12/2014 | Meier | .................. | G06V 30/412 382/182 |
| 2015/0052041 A1 * | 2/2015 | Boyanov | .............. | G06Q 40/025 705/38 |

OTHER PUBLICATIONS

"Linking an External Account." Simple Support Articles, Oct. 28, 2014, www.simple.com/help/articles/move-money/linking-an-external-account. (Year: 2014).*

\* cited by examiner

*Primary Examiner* — Kito R Robinson
*Assistant Examiner* — Shacole C Tibljas
(74) *Attorney, Agent, or Firm* — Patterson + Sheridan, LLP

(57) ABSTRACT

The disclosed embodiments provide a system that verifies user attributes. During operation, the system obtains financial data containing a set of strings representing a set of deposits into one or more financial accounts of one or more users. Next, the system generates one or more clusters of the deposits according to a similarity between pairs of strings in the set of strings. For each cluster from the one or more clusters, the system associates a subset of the strings in the cluster with an income source and extracts one or more employment attributes of a user from a subset of the deposits associated with the user in the cluster. Finally, the system uses the one or more employment attributes to provide an automatic verification of an income of the user.

20 Claims, 5 Drawing Sheets

TRANSACTION-BASED VERIFICATION OF INCOME AND EMPLOYMENT

BACKGROUND

Related Art

The disclosed embodiments relate to techniques for processing financial transaction data. More specifically, the disclosed embodiments relate to techniques for transaction-based verification of income and employment.

Income and employment verification is commonly used with processes such as rental applications, loan applications, job interviews, and/or background checks. However, such verification typically requires the manual procurement and presentation of documentary evidence of income or employment, such as employment verification letters, pay stubs, or tax returns. Moreover, the evidence may constitute a privacy and/or security risk because such documents can be forged and typically provide more information than is required to verify that an employment or income requirement is met. For example, a set of pay stubs may establish a user's employer and income but may also reveal the user's tax withholdings, deductions, tax filing status, bonus income, and/or time off work.

Consequently, income and employment verification may be improved by reducing the presentation and use of employment or income documents during such verification.

SUMMARY

A person's income and employment may be verified prior to receiving a loan, renting a property, receiving a job offer, or passing a background check. However, such verification typically requires the person to manually obtain and present documents such as employment verification letters, pay stubs, or tax returns. In addition, the documents may contain additional information that is not relevant to the verification and constitutes a privacy risk to the person, such as tax deductions, tax filing status, insurance deductions, personal deductions, or paid and unpaid time off. Finally, the verification process may be circumvented by faking such documents.

To address such efficiency, privacy, and security concerns, verification of the person's income or employment may be conducted automatically by analyzing financial data containing deposits into the person's financial accounts. The financial data may be aggregated from one or more financial institutions maintaining the financial accounts. The financial data may include strings representing the deposits; each string may include a description of the deposit, a date of the deposit, and an amount of the deposit. Strings with similar descriptions may be clustered and associated with an income source such as an employer, and the clustered strings may be used to extract one or more employment attributes of the person, such as the person's length of employment, start date, end date, income, employer, and/or pay period.

The employment attribute(s) may then be used to provide an automatic verification of the user's employment or income. For example, the employment attribute(s) may be used to automatically verify that a requirement associated with the income or the employment of the user is met, and the automatic verification of the requirement may be provided to a source of the requirement without disclosing additional information from the employment attribute(s) or financial data.

The disclosed embodiments provide a system that verifies user attributes. During operation, the system obtains financial data containing a set of strings representing a set of deposits into one or more financial accounts of one or more users. Next, the system generates one or more clusters of the deposits according to a similarity between pairs of strings in the set of strings. For each cluster from the one or more clusters, the system associates a subset of the strings in the cluster with an income source and extracts one or more employment attributes of a user from a subset of the deposits associated with the user in the cluster. Finally, the system uses the one or more employment attributes to provide an automatic verification of an income of the user.

In some embodiments, associating the subset of the strings in the cluster with the income source includes storing the set of strings in memory, and storing an income-source-to-string mapping that maps an identifier for the income source to memory references associated with the subset of strings in the cluster.

In some embodiments, the system also obtains employment data for the one or more users from a third-party data source. Next, the system resolves an identity of the income source by matching the employment data to the subset of the strings in the cluster. The system then includes the identity of the income source in the one or more employment attributes.

In some embodiments, the employment data includes social network data, a tax form, and/or a tax return.

In some embodiments, the system also normalizes the set of strings prior to generating the one or more clusters of the deposits.

In some embodiments, normalizing the set of strings includes removing at least one of numbers, whitespace, and special characters from the set of strings.

In some embodiments, upon detecting a co-occurrence of a change in the subset of the strings associated with the income source, the system associates the change with the income source.

In some embodiments, associating the subset of the strings in the cluster with the income source includes using a common substring found in the subset of the strings as an identifier for the income source.

In some embodiments, using the one or more employment attributes to provide an automatic verification of the income of the user includes using the one or more employment attributes to automatically verify that a requirement associated with the income or the employment of the user is met, and providing the automatic verification of the requirement to a source of the requirement without disclosing additional information from the one or more employment attributes.

In some embodiments, the one or more employment attributes include a length of employment, a start date, an end date, an income, an employer, and/or a pay period.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

A person's income and employment may be verified prior to receiving a loan, renting a property, receiving a job offer, or passing a background check. However, such verification typically requires the person to manually obtain and present documents such as employment verification letters, pay stubs, or tax returns. In addition, the documents may contain additional information that is not relevant to the verification and constitutes a privacy risk to the person, such as tax deductions, tax filing status, insurance deductions, personal deductions, or paid and unpaid time off. Finally, the verification process may be circumvented by faking such documents.

To address such efficiency, privacy, and security concerns, verification of the person's income or employment may be conducted automatically by analyzing financial data containing deposits into the person's financial accounts. The financial data may be aggregated from one or more financial institutions maintaining the financial accounts. The financial data may include strings representing the deposits; each string may include a description of the deposit, a date of the deposit, and an amount of the deposit. Strings with similar descriptions may be clustered and associated with an income source such as an employer, and the clustered strings may be used to extract one or more employment attributes of the person, such as the person's length of employment, start date, end date, income, employer, and/or pay period.

The employment attribute(s) may then be used to provide an automatic verification of the user's employment or income. For example, the employment attribute(s) may be used to automatically verify that a requirement associated with the income or the employment of the user is met, and the automatic verification of the requirement may be provided to a source of the requirement without disclosing additional information from the employment attribute(s) or financial data.

Figure 1:
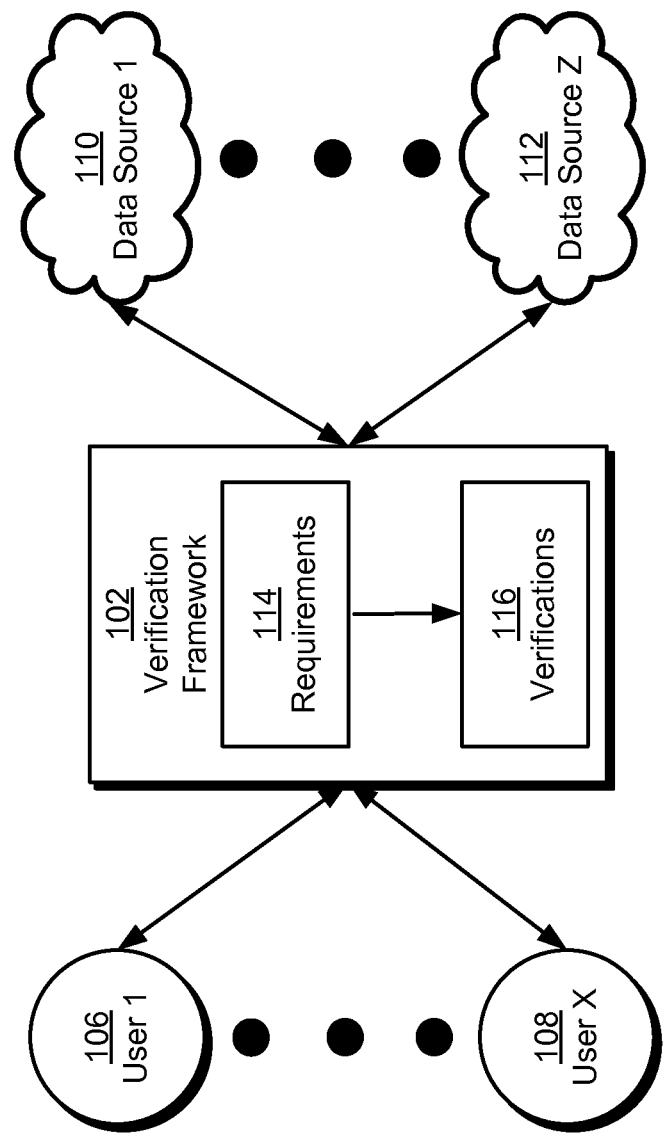
FIG. 1 shows a schematic of a system in accordance with the disclosed embodiments.

FIG. 1 shows a schematic of a system in accordance with the disclosed embodiments. The system includes a verification framework 102 that provides automatic verifications 116 for a set of users (e.g., user 1 106, user x 108) based on data from a number of data sources (e.g., data source 1 110, data source z 112). As shown in FIG. 1, verifications 116 may be generated using the data based on requirements 114 that are to be met by the users.

In one or more embodiments, verifications 116 are generated for requirements 114 related to employment and/or income of the users. For example, verifications 116 may relate to requirements 114 associated with the users' length of employment, type of employment (e.g., full-time, part-time, contractor, etc.), employers, and/or income levels. Such requirements 114 may be made during processes such as rental applications, job applications, background checks, and/or loan applications.

To enable employment and/or income verification without presenting documents such as employment verification letters, pay stubs, and/or tax returns, verification framework 102 may obtain financial data associated with the users from the data sources. For example, verification framework 102 may aggregate the financial data from online banking accounts of the users. The aggregated financial data may be obtained from bills, invoices, receipts, statements, financial accounts, paychecks, and/or financial documents of the users.

To obtain the financial data, verification framework 102 may interface with financial institutions such as banks, brokerage firms, and/or other providers of financial data. For example, verification framework 102 may communicate with the providers over one or more networks, such as local area networks (LANs), wide area networks (WANs), personal area networks (PANs), virtual private networks, intranets, cellular networks, Wi-Fi (Wi-Fi® is a registered trademark of Wi-Fi Alliance) networks, Bluetooth (Bluetooth® is a registered trademark of Bluetooth SIG, Inc.) networks, universal serial bus (USB) networks, and/or Ethernet networks. During communication with the providers, verification framework 102 may use web services and/or other network-based services to log in to the online user accounts and obtain financial data from the online user accounts. For example, verification framework 102 may obtain authentication credentials for the online user accounts from the users, access the online user accounts using the authentication credentials, and use predetermined user flows with the providers to navigate to web pages containing the financial data and scrape the financial data from the web pages.

Verification framework 102 may also include functionality to produce verifications 116 based on data from other third-party data sources. For example, verification framework 102 may supplement financial data from financial institutions with tax forms from employers or the government and/or social network data from social-networking services.

Verification framework 102 may extract employment attributes of the users from the data and use the employment attributes to generate automatic verifications 116 for the users. As described in further detail below, the employment attributes may be extracted from clusters of financial data that are associated with specific income sources (e.g., employers). For example, the clusters may be generated according to a similarity between pairs of strings describing deposits in the financial data, and the employment attributes for a given user may be obtained from subsets of the deposits within a cluster that are associated with the user. Verifications 116 of requirements 114 may then be generated based on the employment attributes and provided without disclosing additional information from the employment attributes. For example, a verification that a user meets a minimum income level to rent an apartment or house may be produced without revealing the user's actual income, employer, deductions, tax filing status, and/or paid or unpaid time off.

Figure 2:
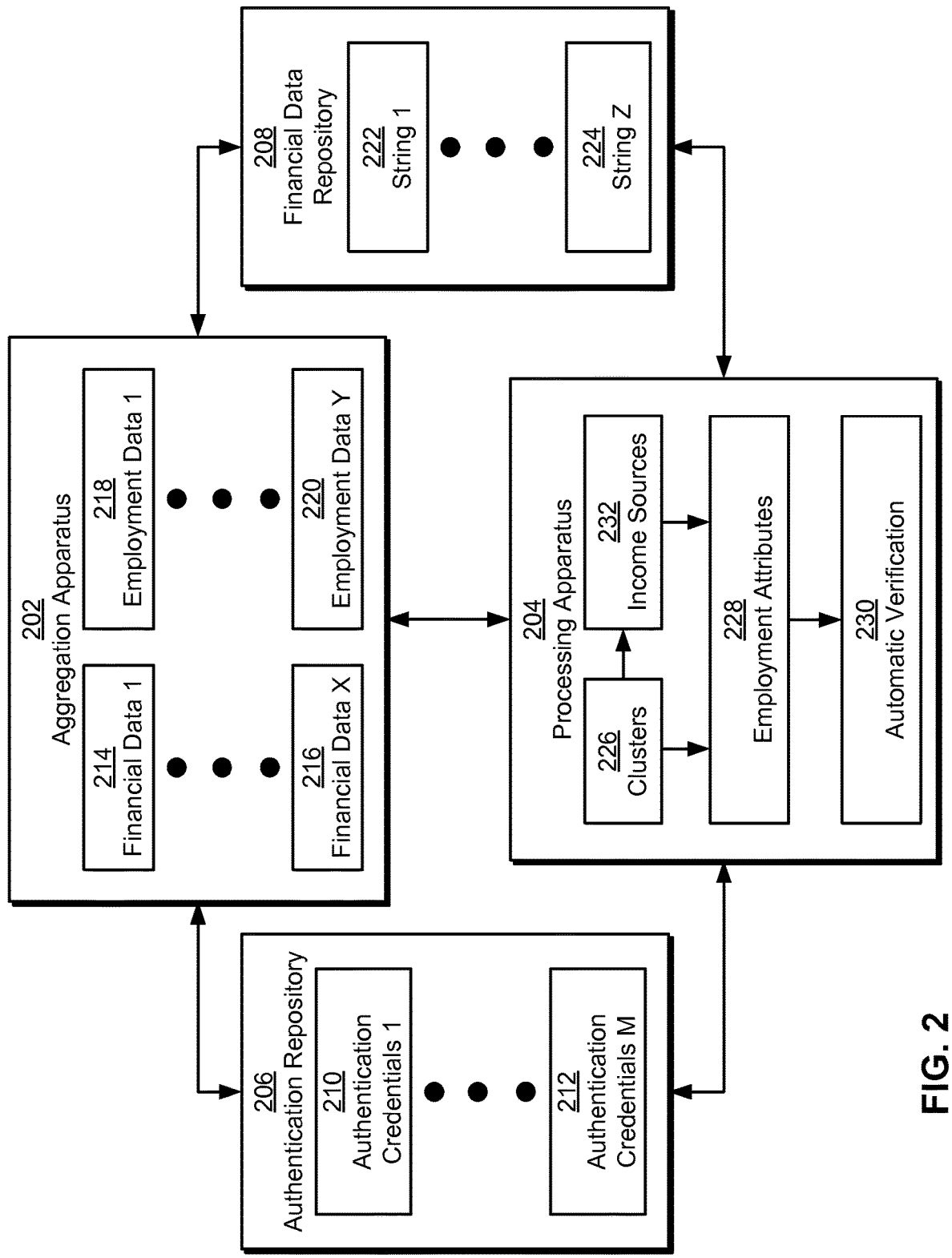
FIG. 2 shows a system for verifying user employment attributes in accordance with the disclosed embodiments.

FIG. 2 shows a system for verifying user employment attributes in accordance with the disclosed embodiments. The system may be a verification framework such as verification framework 102 of FIG. 1. As shown in FIG. 2, the system includes an aggregation apparatus 202 and a processing apparatus 204. Each of these components is described in further detail below.

Aggregation apparatus 202 may aggregate financial data (e.g., financial data 1 214, financial data x 216) from a number of online user accounts. As mentioned above, the online user accounts may be associated with financial institutions, government agencies, employers, merchants, and/or other providers of financial data. To aggregate the financial data, aggregation apparatus 202 may obtain stored authentication credentials (e.g., authentication credentials 1 210, authentication credentials m 212) for each online user account and use the authentication credentials to access the online user account. For example, aggregation apparatus 202 may obtain a username and password, biometric identifier, personal identification number (PIN), certificate, and/or other authentication credentials for the online user account from authentication repository 206 and use the authentication credentials to log in to the online user account as the user.

Authentication credentials in authentication repository 206 may be provided by the users and stored for subsequent use by the data-management system. For example, the users may provide authentication credentials for online banking accounts and/or other types of online user accounts during registration with a financial data-management system such as a personal financial-management service, accounting application, and/or tax-preparation application. The users may also add new authentication credentials to authentication repository 206 and/or modify existing credentials in authentication repository 206 during the addition and/or update of online user accounts within an offering that uses financial data aggregated by aggregation apparatus 202.

Aggregation apparatus 202 may also use a set of predefined user flows for websites, web applications, and/or other web-based providers of the online user accounts to aggregate financial data from the online user accounts. Each user flow may identify a sequence and/or layout of user-interface elements, Uniform Resource Locators (URLs), web pages, files, and/or other attributes that may be used to navigate the online user accounts and aggregate financial data from the online user accounts. For example, aggregation apparatus 202 may use a user flow for a financial institution website to log in to a user's online banking account and navigate within the website to one or more web pages containing account information for the online banking account. Aggregation apparatus 202 may scrape the account information from the web page(s) and store the account information, along with other financial data from other online user accounts, in a financial data repository 208.

In one or more embodiments, some or all of the financial data aggregated by aggregation apparatus 202 is stored as a set of strings (e.g., string 1 222, string z 224) in financial data repository 208. Each string may represent a financial transaction such as a deposit, withdrawal, fee, interest payment, transfer, loan payment, and/or bill payment. The string may include information such as a date of the financial transaction, a description of the financial transaction, an amount of the financial transaction, and/or a status of the financial transaction (e.g., pending, completed, denied, cancelled, etc.). For example, a string representing a deposit may have the following format:

2013-03-15 PAYROLL DEPOSITVILLAGE LTD H 2000.59 The first portion of the string specifies the date of the transaction (e.g., "2013-03-15"), the second portion of the string provides a description of the transaction (e.g., "PAYROLL DEPOSITVILLAGE LTD H"), and the third portion of the string provides an amount of the transaction (e.g., "2000.59").

Aggregation apparatus 202 may also obtain employment data (e.g., employment data 1 218, employment data y 220) from one or more third-party sources. The employment data may include data provided by the users and/or third-party data sources. For example, the employment data may include a user's self-declared employer, dates of employment, position, salary range, and/or other employment attributes 228 on a social network or online professional network. The employment data may also include other information from trusted sources, such as tax forms or tax returns from an employer and/or governmental agency. The employment data may be stored with strings representing financial data in financial data repository 208 and/or in a separate repository for subsequent retrieval and use by processing apparatus 204 and/or another component of the system.

Like the financial data, aggregation apparatus 202 may obtain the employment data from the third-party data sources using authentication credentials stored in authentication repository 206. Alternatively, aggregation apparatus 202 may use a mechanism such as OAuth to allow the users to approve access to financial and/or employment data by aggregation apparatus 202 without requiring the users to provide authentication credentials for logging into user accounts containing the financial and/or employment data.

After the financial and/or employment data is aggregated by aggregation apparatus 202, processing apparatus 204 may use the financial data and/or employment data to provide an automatic verification 230 of employment and/or income for a user. First, processing apparatus 204 may obtain strings representing a set of deposits into financial accounts of the user and/or other users from financial data repository 208. For example, processing apparatus 204 may separate strings representing deposits from strings representing other financial transactions in financial data repository 208 based on the transaction types (e.g., deposit, withdrawal, interest, etc.) and/or transaction amounts (e.g., positive or negative values) in the strings.

Next, processing apparatus 204 may generate one or more clusters 226 of the deposits according to a similarity between pairs of strings representing the deposits. Because deposits from the same income source (e.g., employer) typically have similar descriptions, clustering the strings by similarity may allow processing apparatus 204 to generate clusters 226 along income source boundaries. For example, processing apparatus 204 may use a clustering technique such as k-means clustering, expectation maximization, and/or hierarchical clustering to produce clusters 226 based on the edit distance between pairs of the strings. Parameters used to generate clusters 226 may additionally be tuned or calibrated using labeled training data. For example, processing apparatus 204 may use a training data set containing strings representing deposits labeled with the income sources (e.g., employers) of the deposits to determine the number of clusters to generate from a given set of strings, the distance function used by the clustering technique, the number of clustering runs to perform before selecting a set of clusters 226, and/or the clustering technique used to generate clusters 226.

Prior to generating clusters 226, processing apparatus 204 may normalize the strings. During normalization, processing apparatus 204 may convert the strings into a normalized form by removing numbers, special characters, and/or whitespace from the strings. For example, processing apparatus 204 may obtain the following strings from financial data repository 208:

2013-08-21 Email XYZCO E-TRF-2798 400.00
2013-08-27 Email XYZ CO E-TRF-2159 400.00
2013-08-30 PAYROLL DEPOSITVILLAGE LTD H 2000.15
2013-09-13 PAYROLL DEPOSITVILLAGE LTD H 2000.91

Processing apparatus 204 may normalize the strings to obtain
"EmailXYZCOETRF" for the first two strings and "PAYROLLDEPOSITVILLAGELTDH" for the last two strings. The strings may then be separated into two clusters, with the first cluster containing the first two strings and the second cluster containing the last two strings.

After clusters 226 are generated, processing apparatus 204 may associate strings in each cluster with a different income source. Continuing with the above example, processing apparatus 204 may use a common substring from substrings in the cluster, such as "EmailXYZCOETRF" or "PAYROLLDEPOSITVILLAGELTDH," as an identifier for the income source. Processing apparatus 204 may then map the cluster and/or strings in the cluster to the identifier.

Processing apparatus 204 may then extract one or more employment attributes 228 of a user from a subset of the deposits associated with the user in one or more clusters 226. Continuing with the previous example, processing apparatus 204 may use a database query to financial data repository 208 and/or another filtering mechanism to identify a subset of the strings representing deposits into the user's financial accounts. Processing apparatus 204 may analyze the dates, amounts, and/or clusters 226 associated with the subset to infer employment attributes 228 such as the user's length of employment, start date, end date, income (e.g., total income or income over a period), and/or pay period (e.g., weekly, biweekly, monthly, inconsistent, etc.) for a given income source. Thus, for the four strings listed above, processing apparatus 204 may obtain a total income of 400.00+400.00, or 800.00 for the income source associated with the first cluster and a total income of 2000.15+2000.91, or 4001.06, for the income source associated with the second cluster.

Those skilled in the art will appreciate that while strings representing deposits from financial data repository 208 may be clustered to represent distinct income sources, the identities of the income sources may be unknown. For example, the identity of an income source identified by the common substring of "PAYROLLDEPOSITVILLAGELTDH" may not be apparent from the content of the substring.

To facilitate resolution of the identities of income sources, processing apparatus 204 may match employment data for the users to clusters 226 of strings. For example, aggregation apparatus 202 and/or processing apparatus 204 may use OAuth to obtain user-stated employment histories (e.g., current and previous employers, employment periods, etc.) of some or all of the users from a social network or an online professional network. Processing apparatus 204 may group the employment histories by employer and/or date and attempt to match users employed by the same employer during a given time period with a cluster of deposits from a common income source within that time period. Each user declaration of current or previous employment at a given employer may thus be perceived as a "vote" that an income source associated with a set of deposits with similar descriptions to the user's financial account(s) during the user's employment corresponds to the employer. If a strong enough correlation is found between a user-declared employer and a cluster of strings representing an income source (e.g., if a number of users declare employment at the employer and receive deposits from the same income source), the identity of the income source may be resolved to be the employer, and the employer may be included in employment attributes 228.

Processing apparatus 204 may also use other types of social network data to verify the identity of a user's employer. For example, a user's declaration that the user works at a certain company may be strengthened if the user has a large number of social network connections to other users who claim to work at the same company.

As described above, employment data for the users may also include verified information such as tax forms and/or tax returns. If such information is available, processing apparatus 204 may use the information to aid in the resolution of income source identities. For example, processing apparatus 204 may match tax forms and/or tax returns that list a given employer for a set of users to a cluster of strings. If the cluster contains strings representing deposits to the financial accounts of the same set of users, the income source represented by the cluster may be resolved to be the employer.

Those skilled in the art will also appreciate that strings representing deposits from a given income source may change over time. For example, changes in the payroll provider, company name, and/or accounting system of an income source may produce a corresponding change in the description of direct deposits from the income source to users employed at the income source. Such a change may disrupt the mapping of the income source's identifier to a predefined cluster of strings representing deposits from the income source.

However, because the change may occur at substantially the same time for all users employed at the income source, the change may be detected by processing apparatus 204 and used to update the association of the cluster with the income source. For example, the co-occurrence of a change in the common substring of a cluster of deposits from "PAYROLL-DEPOSITXYZCO" to "XYZPAY" may be detected by processing apparatus 204 during periodic generation of clusters 226 from strings in financial data repository 208. Because roughly the same set of users is associated with the new substring as the old substring, processing apparatus 204 may infer that the change is related to the encoding of deposits from the same income source and update the identifier associated with the income source with the new substring. Conversely, if periodic deposits to a user's financial account switch from one cluster to another, processing apparatus 204 may infer that the user has changed employers and update employment attributes 228 for the user with the employer associated with the second cluster.

Processing apparatus 204 may also detect and manage co-occurring changes in strings that occur independently of changes at income sources. For example, strings representing direct deposits to a financial institution may change at the same time if the encoding technique used by the financial institution to generate the strings is modified. Processing apparatus 204 may infer that the change was made by the financial institution by analyzing the financial accounts and/or users affected by the change and update clusters 226, income sources 232, and/or employers corresponding to income sources 232 based on the change.

After employment attributes 228 for a given user are obtained based on clusters 226 and/or income sources 232, processing apparatus 204 may use employment attributes 228 to provide automatic verification 230 of the user's employment and/or income. More specifically, processing apparatus 204 may use employment attributes 228 to automatically verify that a requirement associated with the income or the employment of the user is met. Processing apparatus 204 may then provide automatic verification 230 of the requirement to a source of the requirement without disclosing additional information from employment attributes 228. For example, processing apparatus 204 may use the user's annual income from employment attributes 228 to verify that the user meets a minimum income threshold to rent an apartment. Processing apparatus 204 may generate a web page, certification, and/or other automatic verification 230 that the minimum threshold is met and present automatic verification 230 to potential landlords without revealing the user's actual income, employer, social security number (SSN), tax withholdings, and/or other sensitive or private information. As a result, processing apparatus 204 may operate as a trusted source of automatic verifications related to user employment and/or income.

Processing apparatus 204 may also allow the user to configure the information in automatic verification 230. For example, processing apparatus 204 may provide a graphical user interface (GUI) and/or web-based user interface that allows the user to select employment attributes 228, thresholds met by employment attributes 228, and/or other information that can be verified using employment attributes 228 for inclusion in automatic verification 230. Processing apparatus 204 may provide automatic verification 230 in a web page, and the user may provide a link to the web page to potential employers, lenders, landlords, security screeners, and/or other interested parties.

By extracting employment attributes 228 from aggregated deposit information and using employment attributes 228 to generate automatic verification 230, processing apparatus may reduce the amount of manual user effort required to verify a user's income or employment. Moreover, the reduced disclosure of information and/or lack of documents in automatic verification 230 may mitigate security and privacy risks associated with conventional verification mechanisms that require the presentation of employment verification letters, pay stubs, tax forms, and/or other employment or income documents.

Those skilled in the art will appreciate that the system of FIG. 2 may be implemented in a variety of ways. For example, aggregation apparatus 202, processing apparatus 204, authentication repository 206, and financial data repository 208 may be provided by a single physical machine, multiple computer systems, one or more virtual machines, a grid, one or more databases, one or more file systems, and/or a cloud computing system. Aggregation apparatus 202 and processing apparatus 204 may additionally be implemented together and/or separately by one or more hardware and/or software components and/or layers.

Figure 3:
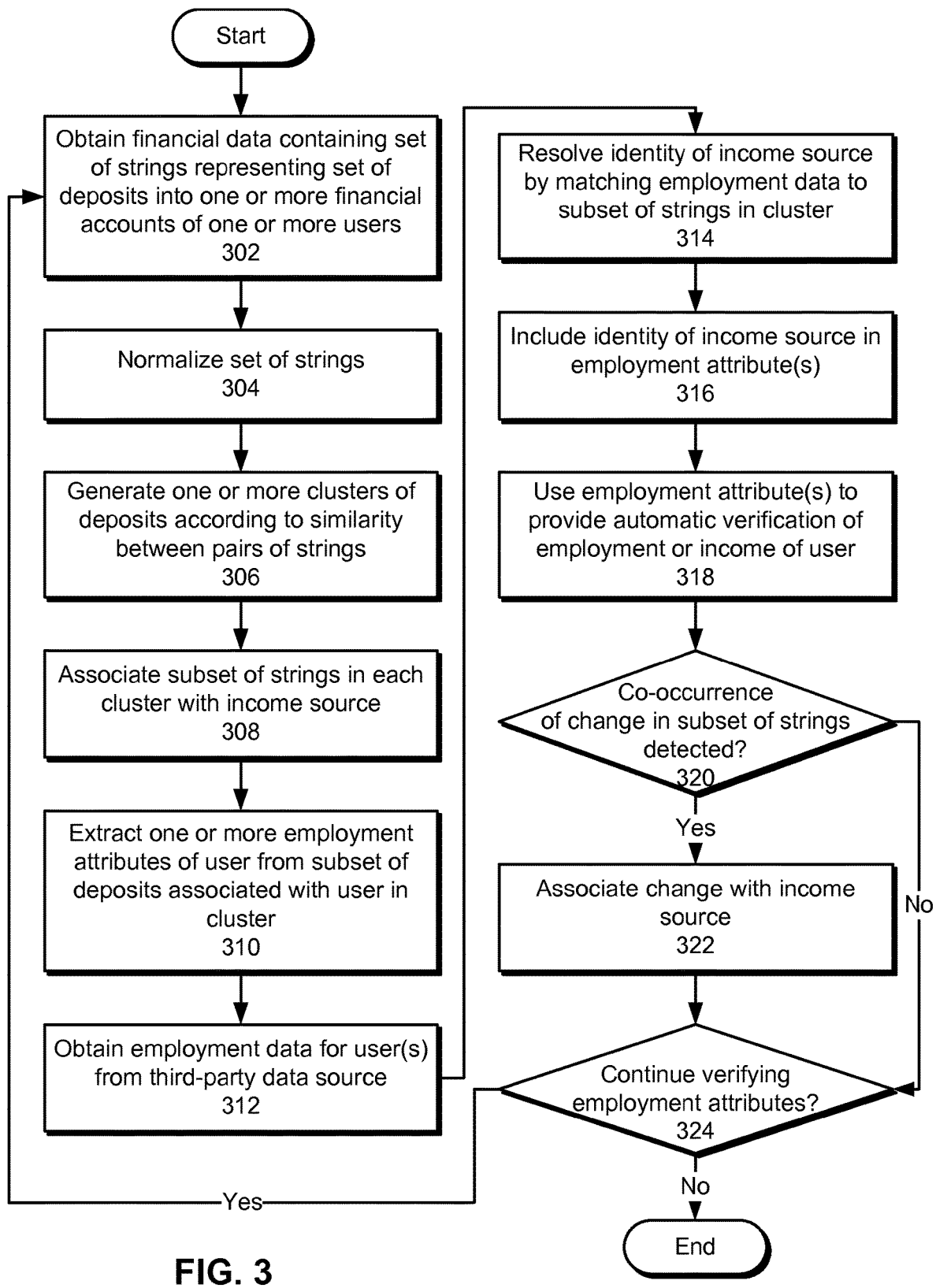
FIG. 3 shows a flowchart illustrating the process of verifying user employment attributes in accordance with the disclosed embodiments.

FIG. 3 shows a flowchart illustrating the process of verifying user employment attributes in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, financial data containing a set of strings representing a set of deposits into one or more financial accounts of one or more users is obtained (operation 302). For example, stored authentication credentials of the user(s) and/or a mechanism such as OAuth may be used to access online user accounts of a set of users with one or more financial institutions, and the financial data may be aggregated from the online user accounts. Alternatively, the financial data may be obtained by extracting the strings from one or more documents provided by the user(s), such as bank statements of the user(s).

Next, the set of strings is normalized (operation 304). For example, the strings may be normalized by removing numbers, whitespace, and/or special characters from the strings. One or more clusters of the deposits are then generated from the normalized strings according to a similarity between pairs of the strings (operation 306). For example, k-means clustering, expectation maximization, hierarchical clustering, and/or other technique capable of producing clusters based on the edit distance between pairs of the strings may be used to cluster the normalized strings. A subset of the strings in each cluster is also associated with an income source (operation 308). For example, a common substring of all normalized strings in the cluster may be used as an identifier for the income source, and the identifier may be mapped to the strings in the cluster.

One or more employment attributes of a user are extracted from a subset of deposits associated with the user in the cluster (operation 310). For example, strings representing deposits to the user's financial accounts may be identified within the cluster, and employment attributes such as the user's length of employment, start date, end date, income, and/or pay period may be extracted from the strings.

The employment attribute(s) may also include the user's employer. To identify the user's employer, employment data for the user(s) is obtained from a third-party data source (operation 312), and the identity of the income source is resolved by matching the employment data to a subset of strings in the cluster (operation 314). For example, the income source may be identified as a given company if deposits in the cluster are associated with a significant number percentage of users who state the company as their employer on a social network or online professional network. User declarations of the employer may be obtained by interface with the social network or online professional network using a mechanism such as OAuth and/or authentication credentials provided by the users. The identity of the income source is then included in the employment attribute(s) (operation 316).

The identity of an income source may also be inferred just from strings in the cluster. For example, if the name of an employer (e.g., a company name) can be extracted from the common substring of some or all strings in the cluster, the name may be used as the identity of the income source in the employment attribute(s). The name may also be matched to a company or organization represented by the name, and additional information (e.g., company size, industry, etc.) about the company or organization may be optionally obtained and provided with the name in employment attributes.

Alternatively, if a strong enough correlation (e.g., over a pre-specified threshold) between strings in the cluster and user-stated employers in the employment data cannot be established, the identity of the income source may be omitted from the employment attribute(s). For example, a user who has not updated his/her profile on an online professional network after switching employers may have recent deposits that belong to a cluster for an income source that does not match the user's stated employer on the online professional network. As a result, employment attributes for the user may list the identity of the income source (e.g., if the identity can be established with employment data for other users associated with deposits in the cluster) or omit an employer for the user.

After the employment attribute(s) are extracted, the employment attribute(s) are used to provide an automatic verification of the employment or income of the user (operation 318). For example, the employment attribute(s) may be used to automatically verify that a requirement associated with the income or the employment of the user is met. The automatic verification of the requirement may then be provided to a source of the requirement without disclosing additional information from the one or more employment attributes.

A co-occurrence of a change in a subset of strings in a cluster may be detected (operation 320). For example, the common substring associated with deposits in a cluster may change at substantially the same time (e.g., during a pay period) for almost all financial accounts to which the deposits are made. If a co-occurring change in the strings of a cluster is detected, the change is associated with the income source (operation 322). For example, the identifier associated with the income source may be changed from the old substring representing the income source to the new substring, as extracted from the changed strings in the cluster. If no co-occurring change is detected, the association of strings in the cluster to the income source is maintained as-is.

Employment attributes may continue to be verified (operation 324) using financial data. If the employment attributes are to be verified, the financial data is periodically obtained (operation 302) and normalized (operation 304). Clusters of deposits from the financial data are also generated (operation 306), and each cluster is associated with an income source (operation 308). One or more employment attributes of a user are extracted from deposits associated with the user (operation 310) in one or more clusters, and employment data is used to resolve the identity of the income source and include the identity of the income source in the employment attribute(s) (operations 312-316). The employment attribute(s) may then be used to provide an automatic verification of the user's income or employment (operation 318). Finally, a co-occurrence of a change in a subset of strings in a cluster is used to associate the change with the income source (operations 320-322). Such automatic verification of employment and/or income for a user may continue until the user no longer uses automatic verification and/or disables the aggregation of data from the user's financial accounts.

Figure 4:
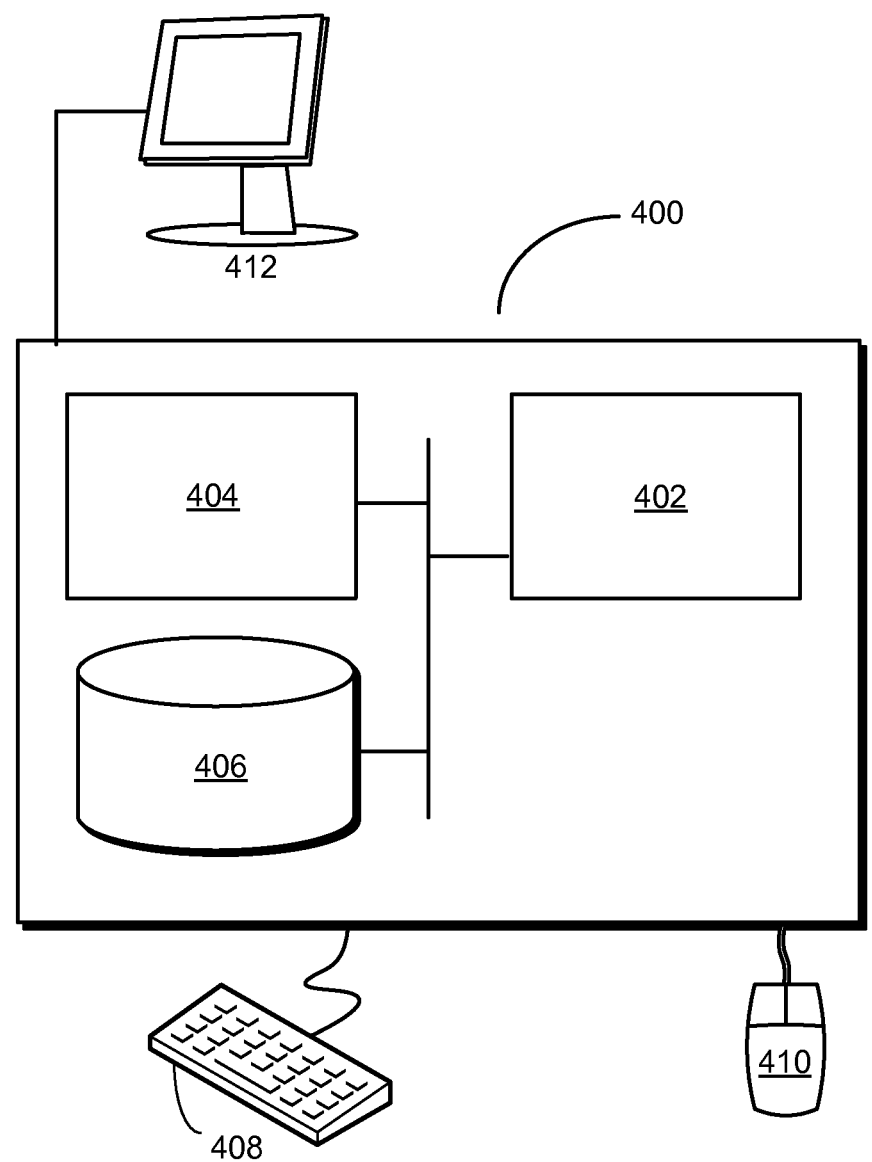
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for verifying user employment attributes. The system may include an aggregation apparatus that obtains financial data containing a set of strings representing a set of deposits into one or more financial accounts of one or more users. The system may also include a processing apparatus that generates one or more clusters of the deposits according to a similarity between pairs of strings in the set of strings. Next, the processing apparatus may associate a subset of the strings in each cluster with an income source and extract one or more employment attributes of a user from a subset of the deposits associated with the user in the cluster. Finally, the processing apparatus may use the employment attribute(s) to provide an automatic verification of an employment and/or income of the user.

In addition, one or more components of computer system 400 may be remotely located and connected to the other components over a network. Portions of the present embodiments (e.g., aggregation apparatus, processing apparatus, etc.) may also be located on different nodes of a distributed system that implements the embodiments. For example, the present embodiments may be implemented using a cloud computing system that provides automatic transaction-based verification of income and employment for a set of remote users.

Figure 5:
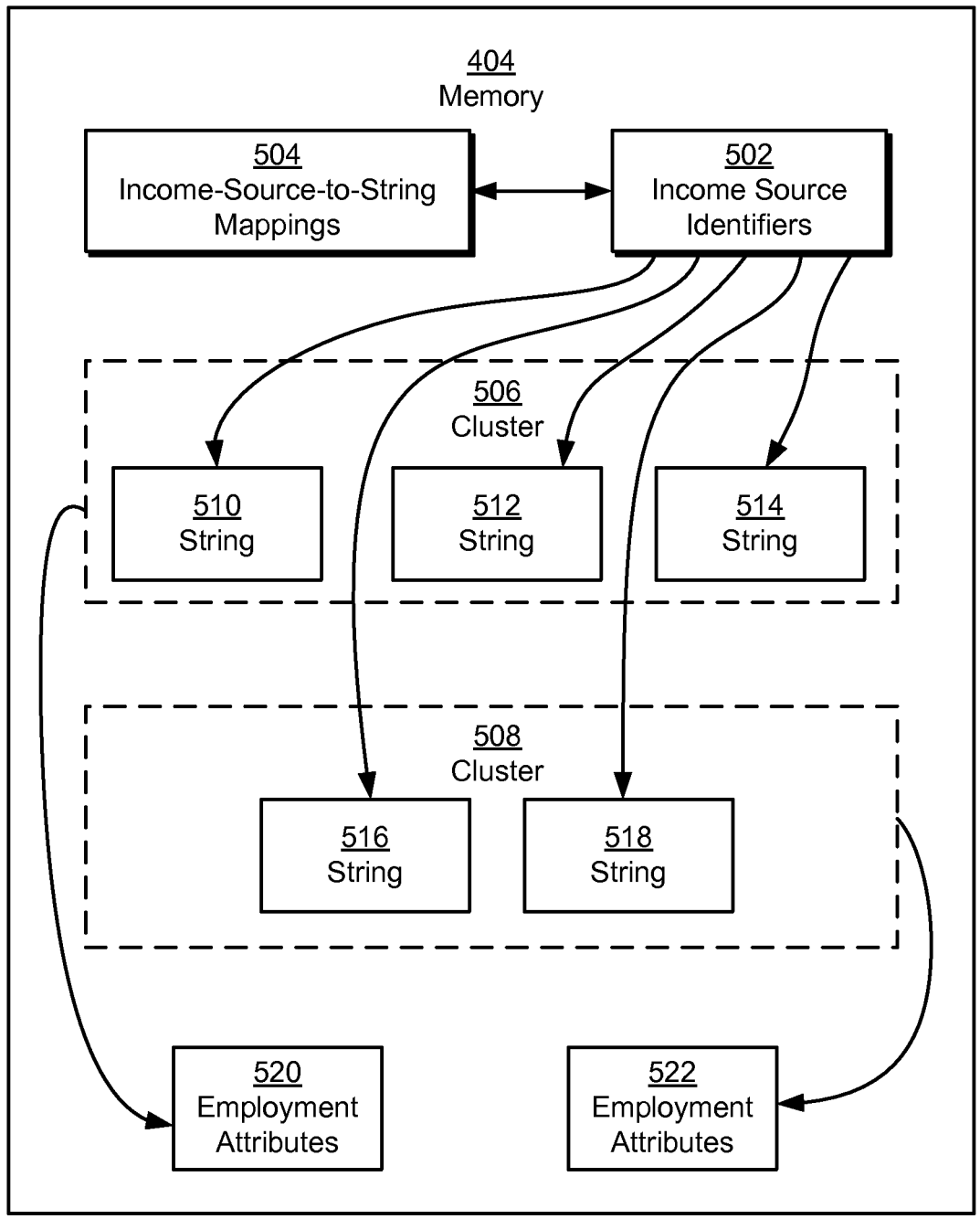
FIG. 5 shows a set of data structures stored in a memory of a computer system in accordance with the disclosed embodiments.

FIG. 5 shows a set of data structures stored in memory 400 of a computer system (e.g., computer system 400 of FIG. 4) in accordance with the disclosed embodiments. The data structures include income source identifiers 502 for one or more income sources. For example, each income source identifier may be set to a common substring found in a cluster (e.g., clusters 226 of FIG. 2) of strings representing the corresponding income source. Income source identifiers 502 may be mapped to a set of strings 510-518 in a number of clusters 506-508 using a set of income-source-to-string mappings 504 in memory 400. For example, income-source-to-string mappings 504 may map each income source identifier 502 to memory references associated with the subset of strings in the cluster representing the corresponding income source. As shown in FIG. 5, income-source-to-string mappings 504 may include mappings from a first income source identifier to memory references for strings 510-514 in a first cluster 506 and mappings from a second income source identifier to memory references for strings 516-518 in a second cluster 508. Thus, income-source-to-string mappings 504 may define clusters 506-508 and identify strings 510-518 within each cluster.

Income-source-to-string mappings 504 may then be used to extract a set of employment attributes 520-522 from strings 510-518 in clusters 506-508. For example, income-source-to-string mappings 504 may be used to identify strings 510-518 in a given cluster 506-508. Subsets of strings associated with a user in the cluster may then be aggregated and used to produce employment attributes (e.g., employment attributes 520-522) of the user, which are also stored in memory 404. Like income-source-to-string mappings 504, memory 404 may include additional mappings among the data structures, such as mappings from employment attributes 520-522 to user identifiers of users, mappings from strings 510-518 to user identifiers or financial institution identifiers of financial institutions, and/or mappings from user identifiers to income source identifiers 502.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining, at a verification system, a set of credentials from a user for a user account associated with the user and comprising transaction data;
    accessing, by the verification system, the user account with the set of credentials to obtain the transaction data from the user account, wherein the transaction data comprises a set of transaction data strings;
    obtaining, from the transaction data, a subset of transaction data strings associated with deposit transactions to the user;
    generating clusters of transaction data strings based on the subset of transaction data strings, wherein each transaction data string in a first cluster of the clusters of transaction data strings is associated with a first deposit transaction source;
    inferring a value of a user attribute based on the first cluster;
    determining, based on transaction data strings of a second cluster of the clusters of transaction data strings and the user attribute, a correlation value related to the user attribute, wherein each transaction data string in the second cluster is associated with a second deposit transaction source, wherein the correlation value represents an amount of correlation between at least a subset of the transaction data strings of the second cluster of the clusters of transaction data strings and a user-declared value for the user attribute, and wherein the second deposit transaction source is different from the first deposit transaction source;
    receiving, from the user, a value threshold associated with the user attribute;
    determining that the correlation value meets the value threshold;
    generating a verification based on the determining that the correlation value meets the value threshold without disclosure of personal identifying information and documents of the user; and
    providing the verification to the user.

2. The method of claim 1, further comprising:
    obtaining employment data for the user from a third-party data source;
    resolving an identity of the first deposit transaction source by matching the employment data to transaction data strings in the first cluster; and
    including the identity of the first deposit transaction source in the user attribute.

3. The method of claim 2, wherein the employment data comprises:
    social network data;
    a tax form; or
    a tax return.

4. The method of claim 1, further comprising normalizing the subset of transaction data strings prior to generating the clusters of transaction data strings.

5. The method of claim 4, wherein normalizing the subset of transaction data strings comprises:
    removing from the subset of transaction data strings at least one of:
        a number;
        a whitespace; or
        a special character.

6. The method of claim 1, wherein the method further comprises:
    detecting a co-occurrence of a change in the subset of transaction data strings associated with the first deposit transaction source; and
    updating the first deposit transaction source with the change.

7. The method of claim 1, wherein the user attribute comprises:
    a length of employment;
    a start date of employment;
    an end date of employment;
    an income;
    an employer; or
    a pay period.

8. An apparatus, comprising:
    a display;
    a processor; and
    a memory storing instructions that, when executed by the processor, cause the apparatus to:
        obtain, at a verification system, a set of credentials from a user for a user account associated with the user and comprising transaction data;
        access, by the verification system, the user account with the set of credentials to obtain the transaction data from the user account, wherein the transaction data comprises a set of transaction data strings;
        obtain, from the transaction data, a subset of transaction data strings associated with deposit transactions to the user;
        generate clusters of transaction data strings based on the subset of transaction data strings, wherein each transaction data string in a first cluster of the clusters of transaction data strings is associated with a first deposit transaction source;
        infer a value of a user attribute based on the first cluster;
        determine, based on transaction data strings of a second cluster of the clusters of transaction data strings and the user attribute, a correlation value related to the user attribute, wherein each transaction data string in the second cluster is associated with a second deposit transaction source, wherein the correlation value represents an amount of correlation between at least a subset of the transaction data strings of the second cluster of the clusters of transaction data strings and a user-declared value for the user attribute, and wherein the second deposit transaction source is different from the first deposit transaction source;

receive, from the user, a value threshold associated with the user attribute;

determine that the correlation value meets the value threshold;

generate a verification based on the correlation value meeting the value threshold without disclosure of personal identifying information and documents of the user; and provide the verification to the user.

9. The apparatus of claim 8, wherein the memory further stores instructions that, when executed by the processor, cause the apparatus to:

obtain employment data for the user from a third-party data source;

resolve an identity of the first deposit transaction source by matching the employment data to transaction data strings in the first cluster; and include the identity of the first deposit transaction source in the user attribute.

10. The apparatus of claim 9, wherein the employment data comprises:

social network data;

a tax form; or a tax return.

11. The apparatus of claim 8, wherein the memory further stores instructions that, when executed by the processor, cause the apparatus to normalize the subset of transaction data strings prior to generating the clusters of transaction data strings.

12. The apparatus of claim 8, wherein the memory further stores instructions that, when executed by the processor, cause the apparatus to:

detect a co-occurrence of a change in the subset of transaction data strings associated with the first deposit transaction source; and update the first deposit transaction source with the change.

13. A non-transitory computer-readable storage medium storing instructions that when executed by a computer cause the computer to perform a method, the method comprising:

obtaining, at a verification system, a set of credentials from a user for a user account associated with the user and comprising transaction data;

accessing, by the verification system, the user account with the set of credentials to obtain the transaction data from the user account, wherein the transaction data comprises a set of transaction data strings;

obtaining, from the transaction data, a subset of transaction data strings associated with deposit transactions to the user;

generating clusters of transaction data strings based on the subset of transaction data strings, wherein each transaction data string in a first cluster of the clusters of transaction data strings is associated with a first deposit transaction source;

inferring a value of a user attribute based on the first cluster;

determining, based on transaction data strings of a second cluster of the clusters of transaction data strings and the user attribute, a correlation value related to the user attribute, wherein each transaction data string in the second cluster is associated with a second deposit transaction source, wherein the correlation value represents an amount of correlation between at least a subset of the transaction data strings of the second cluster of the clusters of transaction data strings and a user-declared value for the user attribute, and wherein the second deposit transaction source is different from the first deposit transaction source;

receiving, from the user, a value threshold associated with the user attribute;

determining that the correlation value meets the value threshold;

generating a verification based on the determining that the correlation value meets the value threshold without disclosure of personal identifying information and documents of the user; and providing the verification to the user.

14. The non-transitory computer-readable storage medium of claim 13, wherein the method further comprises:

obtaining employment data for the user from a third-party data source;

resolving an identity of the first deposit transaction source by matching the employment data to transaction data strings in the first cluster; and including the identity of the first deposit transaction source in the user attribute.

15. The apparatus of claim 11, wherein normalizing the subset of transaction data strings comprises:

removing from the subset of transaction data strings at least one of:

a number;

a whitespace; or a special character.

16. The apparatus of claim 8, wherein the user attribute comprises:

a length of employment;

a start date of employment;

an end date of employment;

an income;

an employer; or a pay period.

17. The non-transitory computer-readable storage medium of claim 14, wherein the employment data comprises:

social network data;

a tax form; or a tax return.

18. The non-transitory computer-readable storage medium of claim 13, wherein the method further comprises normalizing the subset of transaction data strings prior to generating the clusters of transaction data strings.

19. The non-transitory computer-readable storage medium of claim 18, wherein normalizing the subset of transaction data strings comprises:

removing from the subset of transaction data strings at least one of:

a number;

a whitespace; or a special character.

20. The non-transitory computer-readable storage medium of claim 13, wherein the method further comprises:

detecting a co-occurrence of a change in the subset of transaction data strings associated with the first deposit transaction source; and updating the first deposit transaction source with the change.

* * * * *